Figure 1:
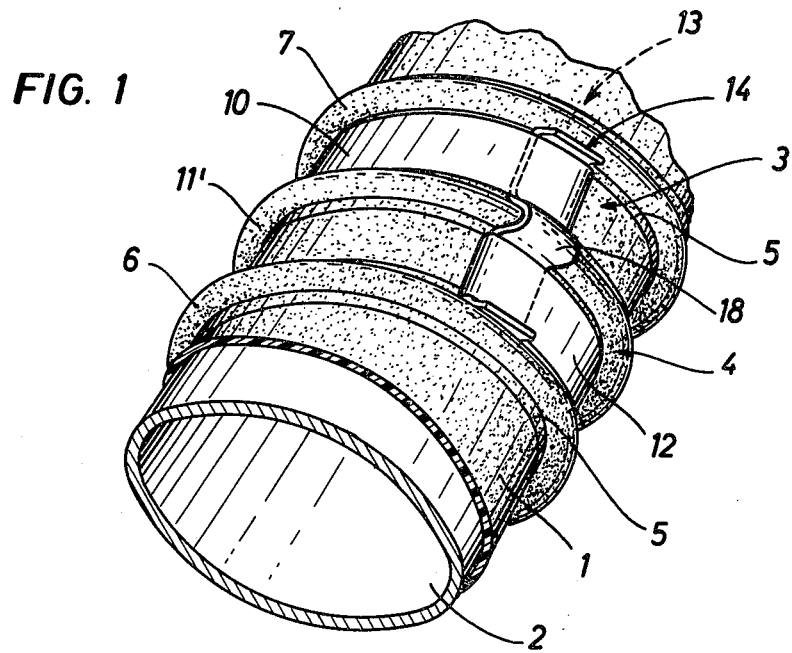
Figure 2:
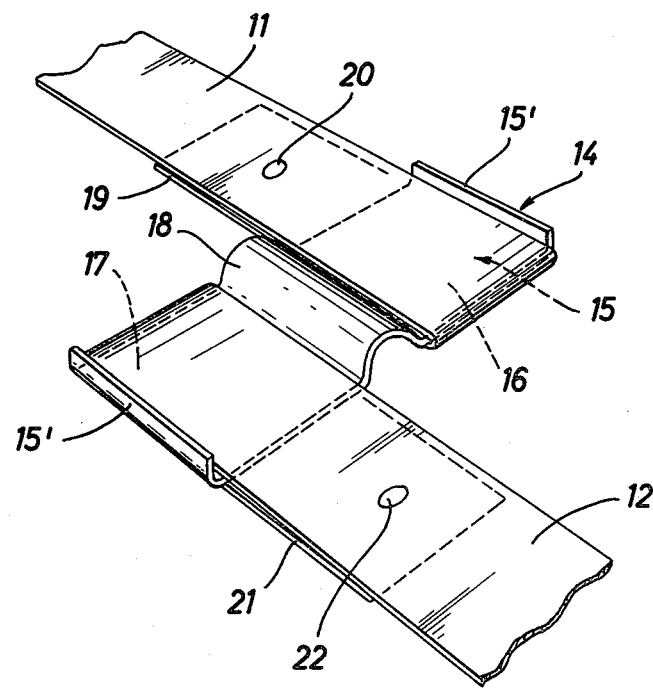
Figure 5:
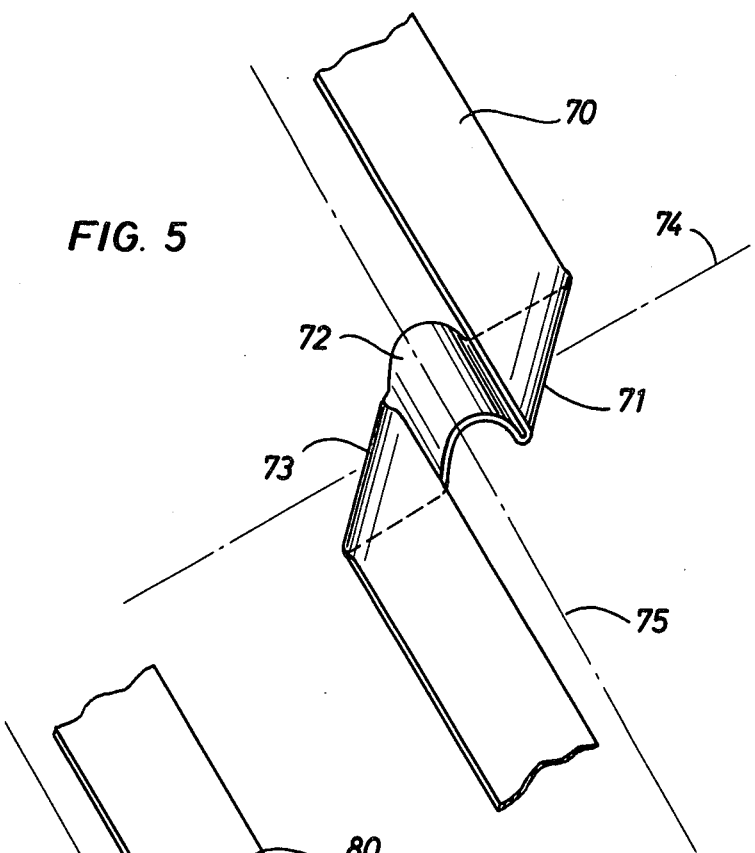

United States Patent [19]

Henning

[11] 4,129,926

[45] Dec. 19, 1978

[54] FASTENING CLIP

[76] Inventor: Wolfgang H. Henning, Duetlingstal, 3538 Niedermarsberg, Nordrhein-Westfalen, Fed. Rep. of Germany

[21] Appl. No.: 749,112

[22] Filed: Dec. 9, 1976

[30] Foreign Application Priority Data

Jan. 5, 1976 [DE] Fed. Rep. of Germany ....... 2600226

[51] Int. Cl.² .............................................. B65D 63/06
[52] U.S. Cl. .................................. 24/22; 285/DIG. 4
[58] Field of Search ....................... 24/22, 23 R, 26, 27, 24/20 R, 21, 23 B, 23 W, 23 EE, 25, 28; 285/365–367, 407, 420, 424, DIG. 4; 138/106, 107, 173; 248/62, 74 B

[56] References Cited

U.S. PATENT DOCUMENTS

| 1,165,730 | 12/1915 | Weaver et al. | 24/28 |
| 1,481,414 | 1/1924 | Cary | 24/23 W |
| 1,693,241 | 11/1928 | Lampert | 24/23 B |
| 3,101,209 | 8/1963 | Jorgenson | 285/DIG. 4 |
| 3,239,258 | 3/1966 | Campbell | 285/DIG. 4 |
| 3,298,721 | 1/1967 | Wiley | 285/424 |
| 3,782,763 | 1/1974 | Henrickson | 285/DIG. 4 |

FOREIGN PATENT DOCUMENTS

| 327544 | 10/1920 | Fed. Rep. of Germany | 24/23 B |
| 2099 of | 1872 | United Kingdom | 24/23 |

Primary Examiner—Doris L. Troutman
Attorney, Agent, or Firm—Albert F. Kronman

[57] ABSTRACT

A new form of clip for fastening around spirally-grooved or ribbed pipes, tubes or hose comprises a band, for example of wire or strip, which can be tightened up by the usual means, but has its end remote from these means overlapped and held by a bridge portion which can be fitted into the grooves or ribs of the hose to hold the fastening in correct position.

4 Claims, 6 Drawing Figures

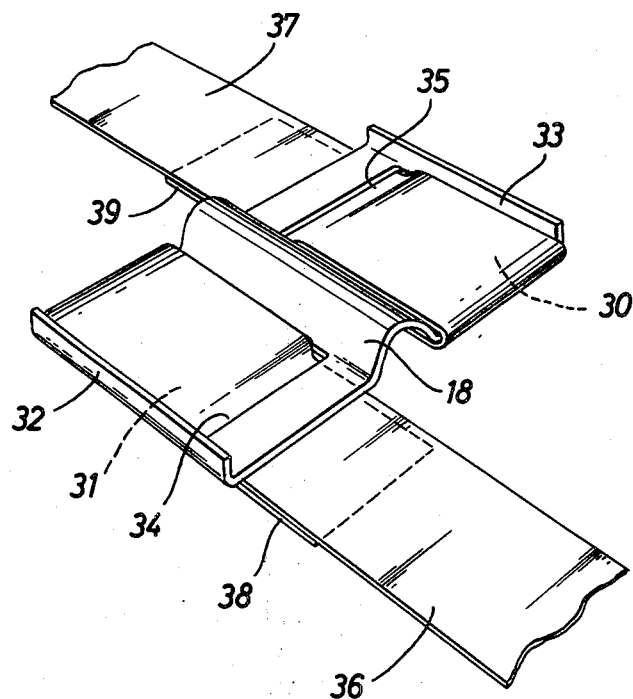
FIG. 3
FIG. 4
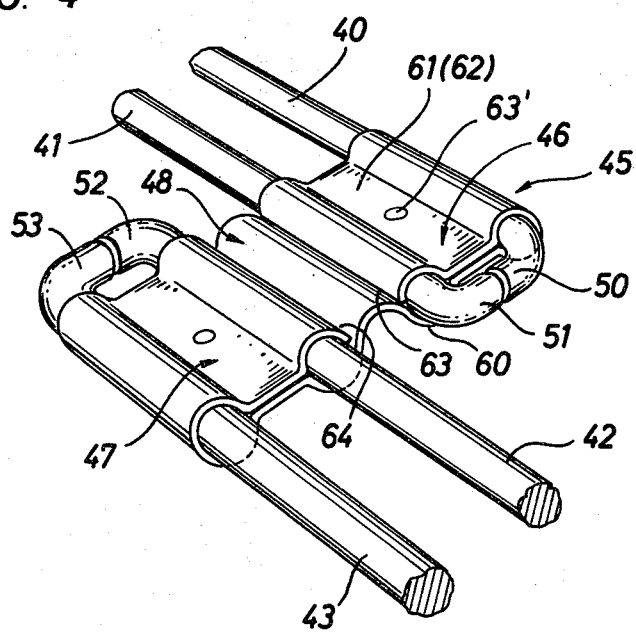

U.S. Patent  Dec. 19, 1978  Sheet 3 of 3  4,129,926

FASTENING CLIP

This invention relates to a clip for fastening around spirally-ribbed hose, tubes or pipes (hereinafter referred to as hose) and of the kind comprising a band of strip material or wire which can be tightened up by at least one tightening screw or the like, this band extending around at least one complete turn represented by a rib or equivalent of the hose. Where reference is made herein to a tightening screw it is to be understood that any like fastening means are to be understood as falling within the terms of this invention, even for example such devices as comprise a prong or buckle.

A clip of this kind for spirally-ribbed hose is known from German Pat. OS 2027584. In this clip the ends of the band overlap at the tightening screw so that the two ends are pressed directly against one another by this screw. This arrangement has the disadvantage that where spiral windings of different pitch are encountered or where diameters of the hose are different, it is necessary to use different tightening screws; moreover the known clip described above cannot be used for small hose diameters, for example those of a diameter of less than 70 mm, or if so used is not found very successful.

It is an object of the present invention to provide a clip of the type setforth above in which use can be made of tightening screws of quite normal construction and the clip readily adapted to variant diameters or shapes of the article served, without involving excessive outlay. This object is achieved in the present invention by using an arrangement in which the clip comprises a band which is overlapped at one part thereof at least with the overlapped parts lying side-by-side, and the clip comprises a bridge portion which connects the said overlapped parts together and has means for engaging the same between adjacent ribs of the hose. Whilst in cases of comparatively small hose diameters a single clamping screw will be generally provided at the opposite side of the hose to the bridge portion or section, it is also possible in the case of hose of larger diameter to provide a plurality of clips in succession along it, and in this case not only must a plurality of bridge portions be used but also under some circumstances a number of clamping screws.

One embodiment of the invention resides in an arrangement in which the bridge portion which is made as a single individual part comprises attachment sections which engage beneath and/or above the free ends of the band or wire and a central section which is curved in conformity with the ribbing of the hose. By the word rib we refer within the meaning of this invention to any type of winding or a thread which defines grooves, valleys, or ribs of various cross-sections in the hose.

The two attachment sections of the bridge portion mentioned above can be expanded or curved in accordance with the cross-section of the ribbing, that is with the grooves, valleys, or ribs in the hose.

The ends of the band or wire can advantageously be bent back around the attachment sections of the bridge portion and held against these. The method of securing them is not important, for example the ends of the band can be secured to these sections by point welding.

In accordance with a preferred form of the invention the bridge portion consists of a single strip which extends approximately parallel to the axis of the hose and is made of metal, plastics or the like, and the attachment sections of this strip are embraced or engaged by bending back the ends of the band around them. The attachment sections can each have a slot or the like extending transversely to the direction of the band and the ends of the latter can be pushed through these slots; again the attachments sections can be devised to embrace the ends of the band from above and/or below.

The band can be made up of two approximately parallel lengths of wire in which case the attachment sections of the bridge portion can be devised to entrap and hold ends of the wire.

The bridge portion can be composed of strips which are integrally connected with the band or be part of the band itself and formed by bending over the band. In each case the central axis of the bridge portion can define an angle of less than 90° with the axis of the rib of the hose. The holding capacity of a bridge portion of this character is greater than it is in the case when its axis is at rightangles to the rib.

Embodiments of the invention are illustrated in the accompanying drawings in which:

FIG. 1 illustrates in perspective view the application to a spiral hose of a clip of this invention, and FIG. 2 to 6 illustrate five variant forms of the clip, all of these being shown in oblique view.

In the drawings a hose 1, for example of rubber or plastics material, is pushed over a metal tube 2 and held on the tube by a clip 3. The hose has spiral ribbing 4 and in the case illustrated narrow projections 5 from the ribbing extend parallel to each side of the latter.

The clip, having a tightening screw which has not been illustrated, is provided between ribs 6 and 7 of the hose. This screw is located out of sight at the rear side of the hose in the drawing. One end 11 of a band portion 10 of the clip extending from the clamping screw is located between ribs 7 and 11' of the hose whilst another end 12 is disposed between the ribs 6 and 11'. At the part 13 the clip has a bridge portion 14 conforming to the shape of the clamping screw, this part being shown on enlarged scale in FIG. 2.

The bridge portion 14 consists of a single metal strip 15 with edge portions 15' which are flanged off at a rightangle. This strip is made up of aligned sections 16 and 17 each of slightly greater width than the corresponding end portions 11 and 12 of the band. The strip sections 16 and 17 are connected through an integral central section 18 which is arcuately curved and shaped in conformity with the hose ribbing, i.e. with ribs 6, 7 and 11'. The central section 18 is of particular importance because it ensures that the end parts of the band will be disposed within the valleys of the spiral thread of the hose and remain correctly orientated when the clamping screw is tightened up.

The end 11 of the band is disposed at the top between the central section 18 and the flanged margin 15' and is bent back beneath the bridge strip 15 and has its free end 19 connected to the overlapped part of strip 11, for example by point welding 20. Welding of this nature is however not always necessary because it has in practice been found that the bending back of the end of the band is in itself sufficient to retain the band in effective position.

The end 12 of the band is bent back in a similar way over the bridge strip 15 between the marginal part 15' and the central section 18, and the free end 21 can again be connected to the band by point welding 22.

In the modified embodiment illustrated in FIG. 3, the bridge portion has two attachment sections 30 and 31 provided at the two sides of the central section 18 and are provided with flanged edges 32 and 33 respectively. Each of these attachment sections has a slot, 34, 35 respectively, which extends transversely to the central section 18. In this case the free ends of the band can be passed through the slots and wrapped around the attachment sections. The band ends 36 and 37 in this arrangement can be held in the operative position without point welding. The end edges 38 and 39 of the relevant band portions 36 and 37 are disposed beneath the attachment sections 30 and 31.

In the embodiment illustrated in FIG. 4 the spiral tubular band is composed of two substantially parallel wire sections 40, 41 and 42, 43. These wire sections are held together by a bridge portion 45 comprising two attachment sections 46, 47 and a central section 48 which is curved in conformity with the ribbing of the hose.

As can be seen from FIG. 4 the free ends of the wire are completely enclosed by the strip 45 and are bent back tangentially to the hose so that the wire ends, 50, 51 on the one hand, and 52, 53 on the other hand, abut against one another.

The bridge portion is fabricated to provide two attachment section 46 and 47 which extend outwards from the two sides of a central section 48 in mirror-image fashion. The two end sections of the wire 40, 41 are butted together from the underside 60 and the bridge portion is devised to provide overlapped sections 61 and 62 which are fastened together in face-to-face contact by point welding to trap the wire ends 40 and 41 between them. The face edge of this sandwich 61, 62 of the bridge runs parallel to the central section 48 and corresponds to the mirror-image free edge 64 of the other attachment section 47.

It is not however necessary for the connection between the strip or wire parts overlapping the turns of the hose to be a separately made part of sheet metal or, for example, of plastics, and the band itself could be bent round to form the bridge portion. This arrangement is for example illustrated in FIGS. 5 and 6 (opposite the tightening screw in the case of smaller or average diameters of clip). The band 70 is so bent round through a rightangle to provide a bend 71. The connecting part of the band bent around at the underside is curved at 72 in conformity with the ribbing of the hose and the band is then bent back again through a rightangle to form a part 73 extending parallel to the section 71. The band then extends into the adjoining spiral winding in the manner described above.

It is possible for the doubled-over parts of the band to be point welded in the vicinity of the folded edges 71 and 73. This arrangement, which constructively is quite primitive but nevertheless is very effective practically, is so devised that the axis 74 defines with the axis of the central section 75 a rightangle and the bent over parts 71 and 73, which are parallel to one another, are disposed at an angle of 45° to the axes referred to.

Figure 6:
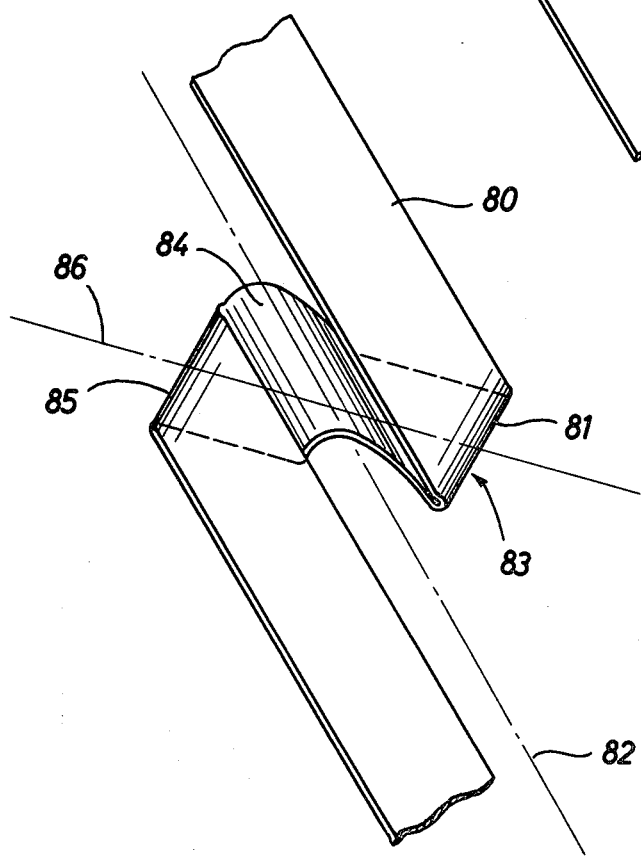

A modified embodiment is illustrated in FIG. 6 where the band 80 is folded at 81 to define an angle of less than 90° between the central axis 82 of the clip and the axis 86 of the bridge section 83, 85. There is a mirror-image bending at the opposite sides of the central section 84.

Here again the two folded-over portions 81 and 85 run parallel to one another but the axis 86 of the bridge section 83, 85. There is a mirror-image bending at the opposite sides of the central section 84.

Here again the two folder-over portions 81 and 85 run parallel to one another but the axis 86 of the bridge portion, as already pointed out, is no longer at a rightangle to the axis 82 of the central section, but for example, at an angle of about 75°. Other angles between about 50° to 85° are feasible.

I claim:

1. In a clip for fastening around a spirally-ribbed hose, of the kind comprising a band which encircles the hose and a bridge portion for tightening the band on the hose, the improvement wherein the band is overlapped, the overlapped parts lying side-by-side, the bridge portion connects the said overlapped parts together and means on said bridge portion for engaging the band between adjacent ribs of the hose.

2. A clip according to claim 1, in which the bridge portion is fashioned from strip material and comprises attachment sections connected to spaced parts of the band and the bridge portion comprises an arched section joining said attachment sections.

3. A clip according to claim 2, in which the said spaced parts of the band are end portions of the latter which are folded back around said attachment sections and engaged therewith.

4. A clip according to claim 3, in which said attachment sections of the bridge portion are provided with slots through which said end portions of the band are tucked and folded back.

* * * * *